(12) United States Patent
Lai et al.

(10) Patent No.: US 6,704,852 B2
(45) Date of Patent: Mar. 9, 2004

(54) CONTROL DEVICE APPLICABLE TO FLASH MEMORY CARD AND METHOD FOR BUILDING PARTIAL LOOKUP TABLE

(75) Inventors: Chen Nan Lai, Hsinchu (TW); Tsair-Jinn Cheng, Hsinchu (TW); Shang Chin Chien, Hsinchu (TW); Chanson Lin, Hsinchu (TW)

(73) Assignee: Key Technology Corporation, Hsinchu (TW)

( * ) Notice: Subject to any disclaimer, the term of this patent is extended or adjusted under 35 U.S.C. 154(b) by 127 days.

(21) Appl. No.: 09/987,787

(22) Filed: Nov. 16, 2001

(65) Prior Publication Data

US 2003/0097520 A1 May 22, 2003

(51) Int. Cl.[7] .............................................. G06F 12/10
(52) U.S. Cl. ....................................... 711/206; 711/103
(58) Field of Search ................................ 711/107, 118, 711/117, 206

(56) References Cited

U.S. PATENT DOCUMENTS

| | | | | |
|---|---|---|---|---|
| 5,381,537 A | * | 1/1995 | Baum et al. ................ | 711/206 |
| 5,524,230 A | * | 6/1996 | Sakaue et al. .............. | 711/103 |
| 5,673,383 A | * | 9/1997 | Sukegawa ...................... | 714/8 |
| 5,694,571 A | * | 12/1997 | Fuller .......................... | 711/113 |
| 5,717,886 A | * | 2/1998 | Miyauchi ..................... | 711/103 |
| 5,740,396 A | * | 4/1998 | Mason ......................... | 711/103 |
| 5,742,934 A | * | 4/1998 | Shinohara ................... | 711/103 |
| 5,812,814 A | * | 9/1998 | Sukegawa .................... | 711/103 |
| 5,895,501 A | * | 4/1999 | Smith .......................... | 711/207 |
| 5,905,993 A | * | 5/1999 | Shinohara ................... | 711/103 |
| 5,946,714 A | * | 8/1999 | Miyauchi ..................... | 711/205 |
| 5,951,685 A | * | 9/1999 | Stancil ........................... | 713/2 |
| 6,421,798 B1 | * | 7/2002 | Lin et al. .................... | 714/718 |
| 6,446,188 B1 | * | 9/2002 | Henderson et al. ......... | 711/206 |
| 6,460,111 B1 | * | 10/2002 | Shinohara ................... | 711/103 |
| 6,516,400 B1 | * | 2/2003 | Suzuki ........................ | 711/209 |
| 2002/0169936 A1 | * | 11/2002 | Murphy ....................... | 711/205 |
| 2003/0018877 A1 | * | 1/2003 | Gaskins et al. ............. | 711/207 |

* cited by examiner

Primary Examiner—Hiep T. Nguyen
(74) Attorney, Agent, or Firm—Rosenberg, Klein & Lee (57) ABSTRACT

The present invention proposes a control device compatible to Smart Media cards, Memory Stick cards, and NAND-gate type flash memories and applicable to various kinds of capacities and a method for fabricating same. After the control device is turned on and scans physical block addresses of each data block of a memory card one by one, it will partition the memory card into a plurality of segments according to the capacity of a segment lookup table therein. A FAT accessory lookup table in the control device is matched and used for lookup of logical addresses of the FAT. When a host computer is to access a file, the segment lookup table can be used for lookup of data in the segment, and the FAT accessory lookup table will match the operation system to quick find the physical block address when the FAT is accessed. The control device can be compatible to flash memory cards of various kinds of capacities, and the required size of the size of total lookup tables built in RAM can be effectively controlled.

12 Claims, 7 Drawing Sheets

CONTROL DEVICE APPLICABLE TO FLASH MEMORY CARD AND METHOD FOR BUILDING PARTIAL LOOKUP TABLE

FIELD OF THE INVENTION

The present invention relates to a control device applicable to flash memory cards and, more particularly, to a control device compatible to Smart Media cards, Memory Stick cards, and NAND-gate type flash memories and applicable to various kinds of capacities and a method for building partial lookup table.

BACKGROUND OF THE INVENTION

Along with continual progress of the information industry, high-speed data storage devices (memories) play very important roles due to influence of ever faster CPUs and development of information appliance (IA) products.

Figure 1:
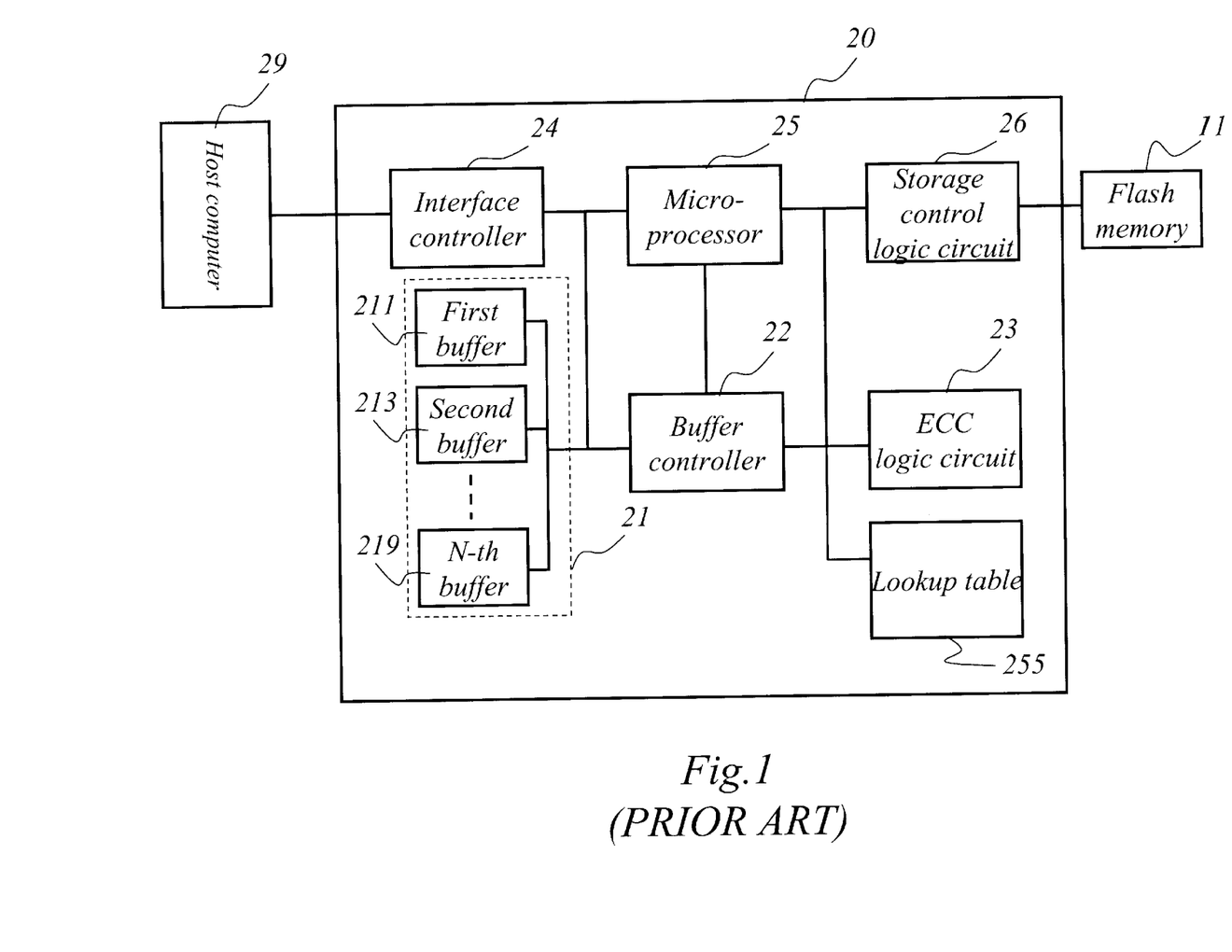
FIG. 1 is a structure diagram of a data storage system in the prior art.

As shown in FIG. 1A, a data storage device (e.g., a Smart Media card, a Memory Stick card, or a NAND-gate type flash memory) 11 is connected to a host computer 29 mainly via a control device 20. Of course, the control device 20 can also be built in a subsystem of the host computer 29. The control device 20 comprises a microprocessor 25 therein, which can be connected to the host computer 29 via an interface controller 24 conforming to the protocol of PCMCIA, IDE, ATA, ATAPI, USB, or their combination. One end of the microprocessor 25 can be connected to the data storage device 11 via a storage control logic circuit 26. The microprocessor 25 can also be connected to a buffer controller 22. The buffer controller 22 can temporarily store the data to be accessed by the host computer 29 into a data storage region 21 (a first buffer 211, a second buffer 213, and an N-th buffer 219). Additionally, an ECC logic circuit 23 conforming to the standard of Smart Media is respectively connected to the microprocessor 25, the buffer controller 22, and the storage control logic circuit 26. The ECC logic circuit 22 is controlled by the microprocessor 25 to give a corresponding error-correcting code (ECC) data to a data sector to be accessed. Certainly, the ECC logic circuit 23 is not required if only applied to Memory Stick cards, but a design conforming to serial circuits and CRC of Memory Stick is required. Moreover, the microprocessor 25 can be connected to a lookup table 255, which can be used to keep logic block addresses ($L_0 \sim L_{k-1}$) and all physical block address (PBA) values of the corresponding data storage device 11.

Figure 2:
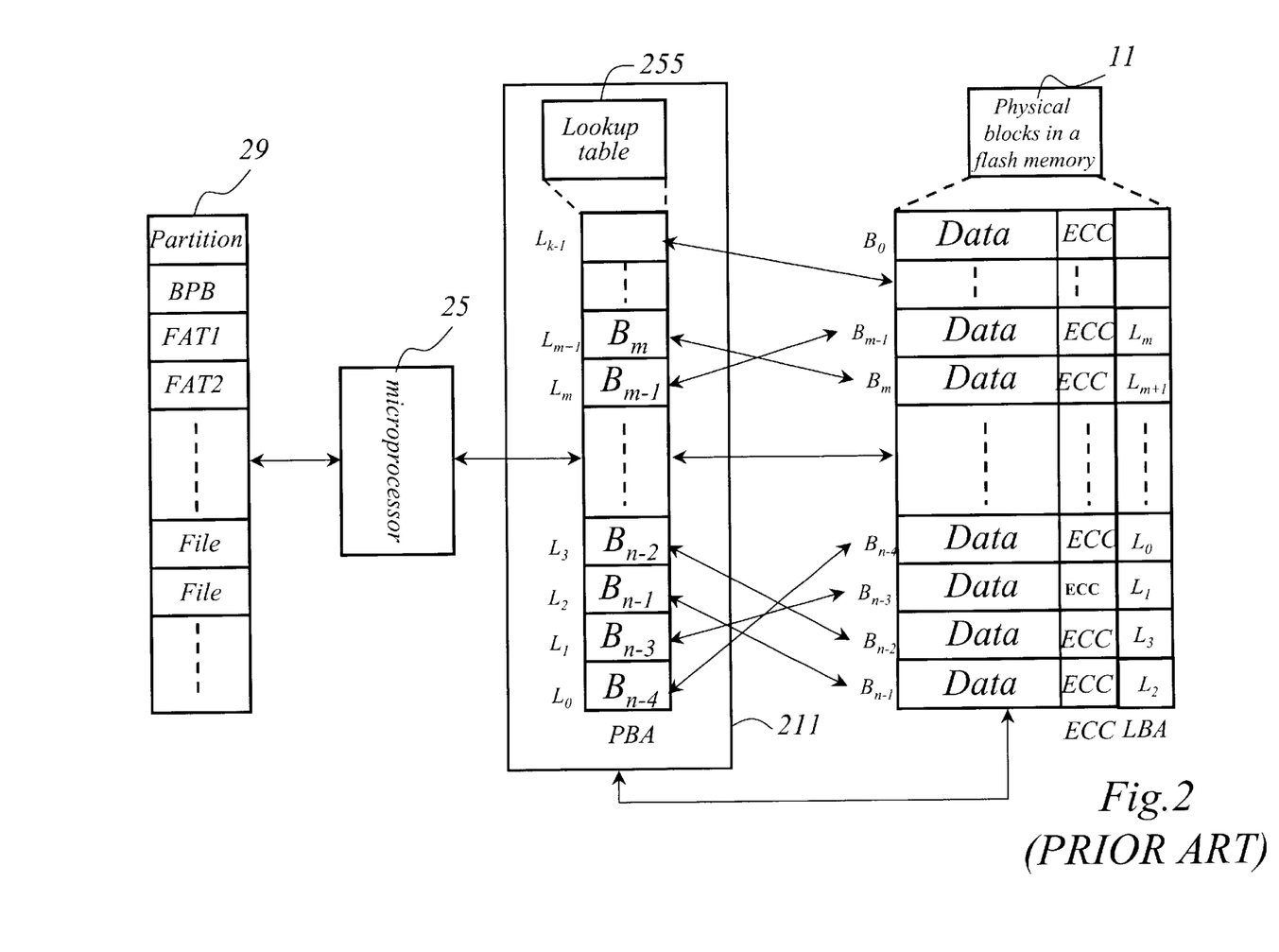
FIG. 2 is a structure diagram of a lookup table of a data storage system in the prior art.

Please refer to FIG. 1 and FIG. 2 is a diagram with the block as a link unit. DATA and ECC only represent general stored data and the accessory ECC data thereof instead of only a piece of data stored therein. In fact, a block comprises 16 or 32 sectors of data and 16 or 32 sets of ECC data. L represents the data stored in an adjunct region of a block. The data thereof is a pointer built when the system is initiating. When the host computer 29 or the control device 20 is turned on, the microprocessor 25 in the control device 20 will control a scan program to scan all physical blocks ($B_0 \sim B_{n-1}$) in the memory card 11 to obtain corresponding logic block address data (LBA; $L_0 \sim L_{k-1}$) of the physical blocks ($B_0 \sim B_{n-1}$, where k is a little smaller than n). The microprocessor 25 then immediately builds these relations in a lookup table 255. In other words, the microprocessor 25 will fill the corresponding physical block addresses (Some block in $B_0 \sim B_{n-1}$, n-k blocks, reserved by system are not mapped with mapping table) of data in the logical block addresses ($L_0 \sim L_{k-1}$) to build a complete mapping relationship. Therefore, when the host computer 29 is to access a file, it can quickly find the corresponding physical block ($B_0 \sim B_n$) wherein the file is stored to access data.

However, the conventional control device of flash memory cards and the method for fabricating same have the following drawbacks.

1. Data storage devices such as Smart Media cards, Memory Stick cards, or NAND-gate type flash memories utilize a block as a basic unit for erasing or storing data. Along with increase of memory capacity, the number of blocks increases accordingly, but the memory capacity of the lookup table is finite. Therefore, an old data storage device will be not compatible to a new data storage device having a higher capacity because that the new memory card needs a lookup table of a larger capacity.

2. If it is necessary to match flash memory cards of high capacity, the static RAM (random access memory) designed in the control device for storing data of the lookup table needs to choose a higher capacity, hence relatively increasing the cost.

3. When the host computer accesses a file, the control device will search the corresponding data blocks in the whole lookup table to perform access of data. Generally speaking, however, the data blocks corresponding to the file exist in adjacent sectors. Therefore, the operation will waste time and usage ratio of memory capacity of the lookup table.

4. When the host computer accesses a file, the read frequency of system data such as the partition table, the BIOS parameter block (BPB), and the FAT (File allocation table) is higher than that of general files. The capacity of these system data is not large, but it is necessary to search the whole lookup table when reading these system data or the file data each time due to specification limit of the conventional flash memory card, hence lengthening operation time and lowering operation speed.

Accordingly, the present invention aims to propose a novel control device of flash memory cards to resolve the problems in the prior art. The present invention not only can be compatible and applicable to flash memory cards or NAND-gate type flash memories of various kinds of capacities, but also can increase usage ratio of memory of the lookup table and shorten the search time of physical blocks.

SUMMARY OF THE INVENTION

The primary object of the present invention is to provide a control device applicable to flash memory cards and a method for building partial lookup table, wherein a storage memory of a fixed capacity of a lookup table can be applicable and compatible to flash memory cards or NAND-gate type flash memories of various kinds of capacities, thereby achieving unlimited expansion and enhancement of compatibility.

The secondary object of the present invention is to provide a control device applicable to flash memory cards and a method for building partial lookup table, wherein a storage memory of a smaller capacity of a lookup table is utilized to match flash memories of various kinds of specification, thereby controlling the cost.

Another object of the present invention is to provide a control device applicable to flash memory cards and a method for building partial lookup table, wherein a segment lookup table and a FAT accessory lookup table are matched and utilized to relatively enhance operation speed and reduce operation time.

Yet another object of the present invention is to provide a control device applicable to flash memory cards and a method for building partial lookup table, wherein a segment lookup table and a FAT accessory lookup table are matched and utilized to save operation time of the system and relatively enhance usage ratio of memory of the lookup table.

The various objects and advantages of the present invention will be more readily understood from the following detailed description when read in conjunction with the appended drawing, in which:

DETAILED DESCRIPTION OF THE PREFERRED EMBODIMENTS

Figure 3:
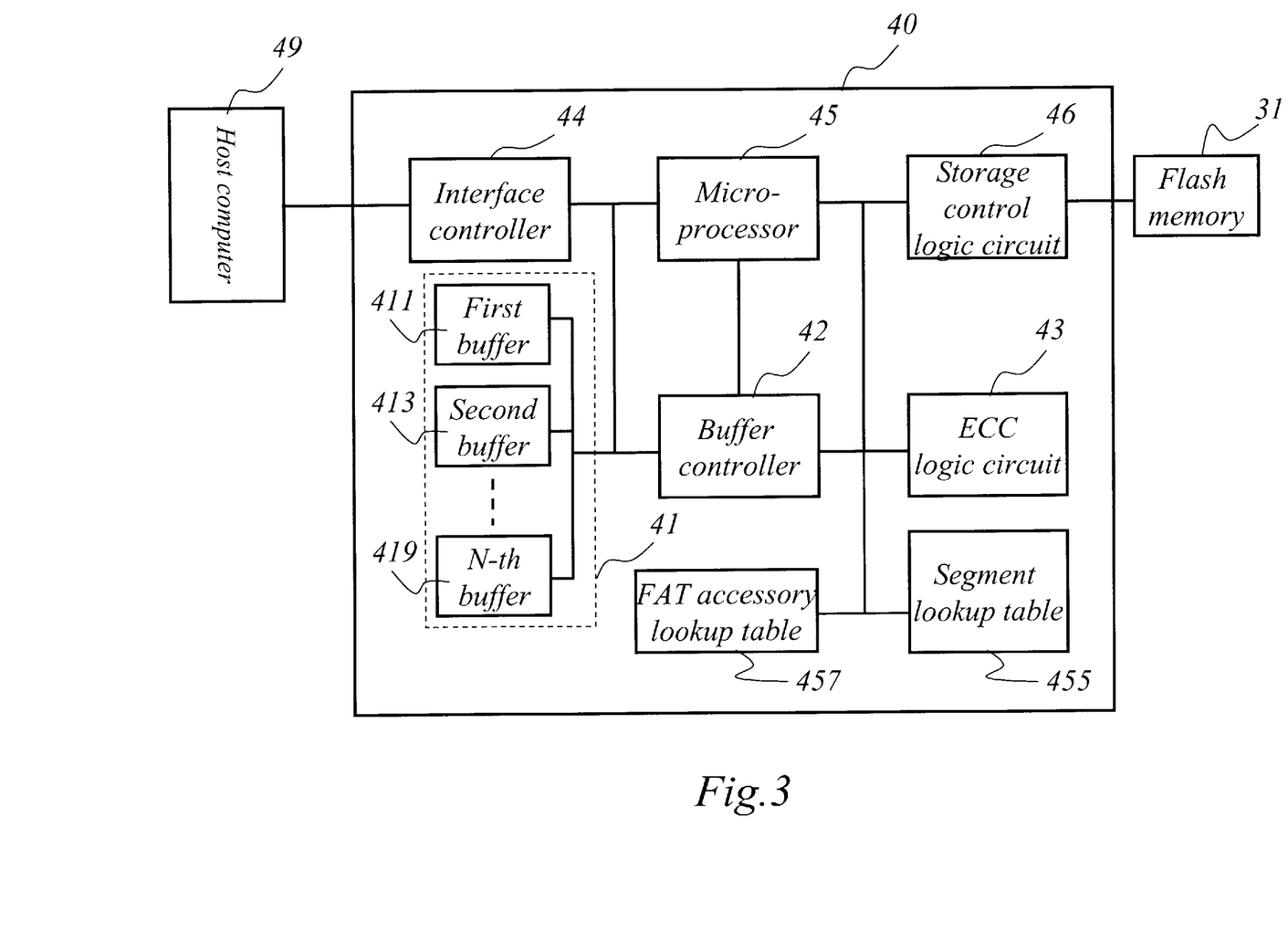
FIG. 3 is a structure diagram of a data storage system according to a preferred embodiment of the present invention.
Figure 4A:
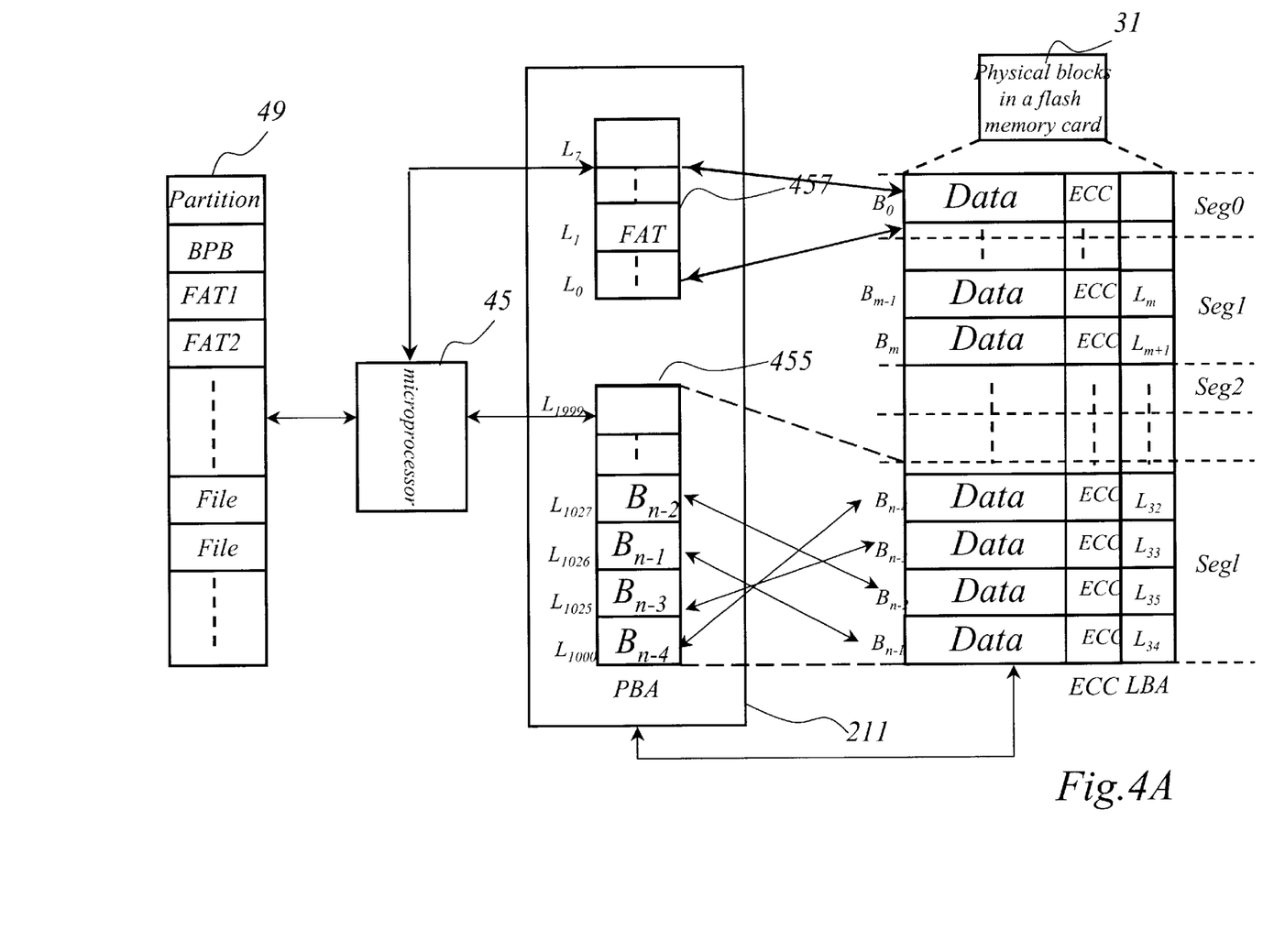
FIGS. 4A to 4B are structure diagrams of a data storage system of the present invention.
Figure 4B:
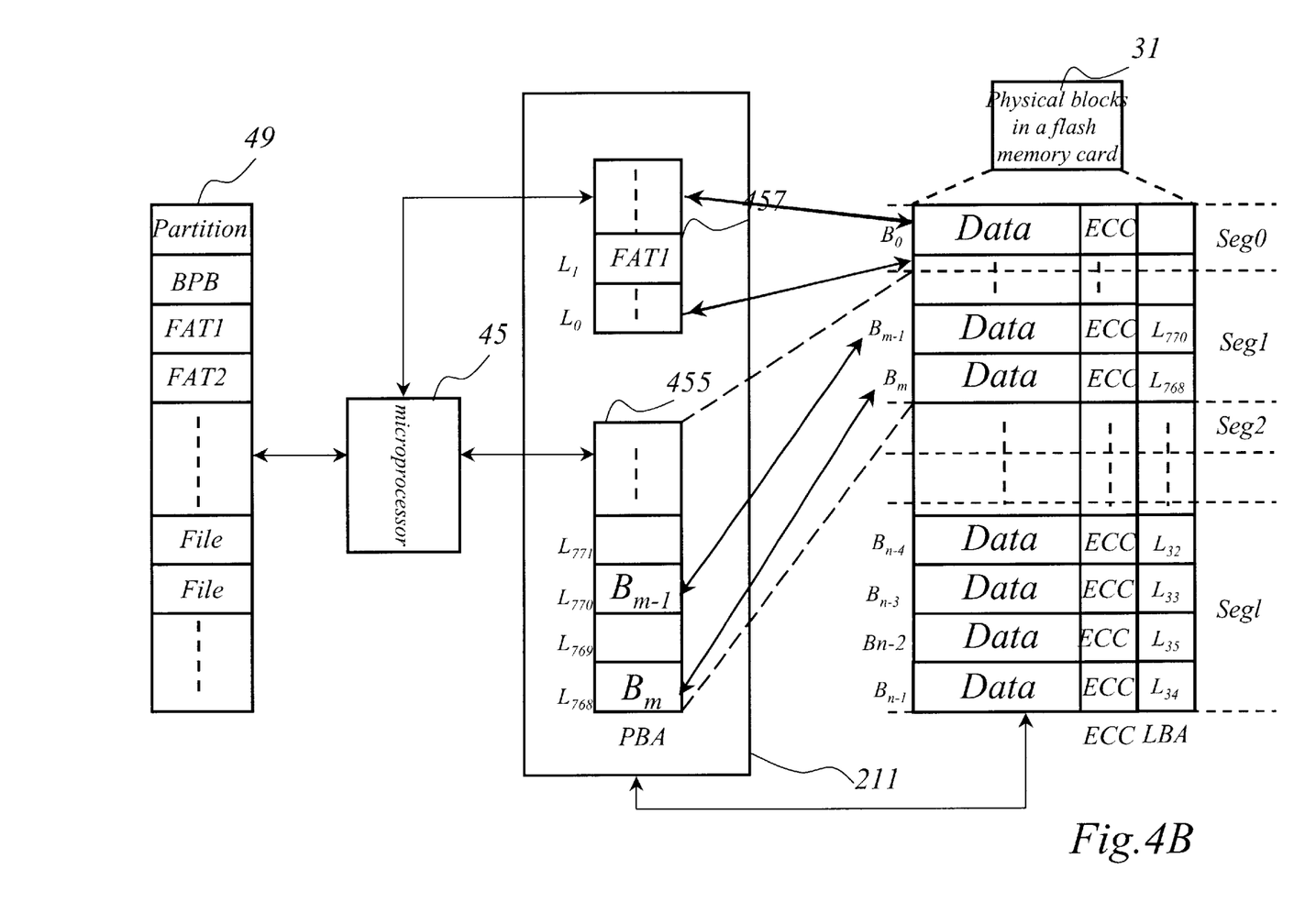

As shown in FIGS. 3 and 4A, at least a data storage device (e.g., a Smart Media card, a Memory Stick card, or an NAND-gate type flash memory) 31 is connected to a host computer 49 mainly via a control device 40. Of course, the control device 40 can also be built in a subsystem of the host computer 49. The control device 40 comprises a microprocessor 45 therein, which can be connected to the host computer 49 via an interface controller 44 conforming to the protocol of PCMCIA, IDE, ATA, ATAPI, USB, or their combination. One end of the microprocessor 45 can be connected to the data storage device 31~39 via a storage control logic circuit 46. The microprocessor 45 can also be connected to a buffer controller 42. The buffer controller 42 can temporarily store the data to be accessed by the host computer 49 into a data storage region 41 (a first buffer 411, a second buffer 413, and an N-th buffer 419, each having the size of a sector). Additionally, an ECC logic circuit 43 conforming to the standard of Smart Media is respectively connected to the microprocessor 45, the buffer controller 42, and the storage control logic circuit 46. The ECC logic circuit 42 is controlled by the microprocessor 45 to give a corresponding ECC data to a data sector to be accessed. Certainly, the ECC logic circuit 43 is not required if only applied to Memory Stick memory cards, but a design conforming to serial circuits and CRC of Memory Stick is required. Moreover, the microprocessor 45 can be connected to a segment lookup table 455 and a FAT accessory lookup table 457. The segment lookup table 455 can be used to keep the selected part of logic block addresses In this example, we choose the second segment which covers logical address $L_{1000} \sim L_{1999}$ and physical address values $B_{1024} \sim B_{2047}$ of the corresponding data storage device 31. The segment size depends on the definition of different cards. The FAT accessory lookup table 457 can be used to store a small lookup table of system data more frequently read such as the partition table, the BPB, and the FAT mapped to the logical addresses.

The control device 40 of the present invention can partition each data storage system 31 (the flash memory card) into at least a segment (Seg0~Seg1) comprising at least a physical block ($B_0 \sim B_{n-1}$) according to capacity of the memory (e.g., RAM) for storing the segment lookup table 455. Each segment (Seg0~Seg1) has almost the same block number.

When the host computer 49 or the control device 40 is turned on, the microprocessor 45 in the control device 40 will control a scan program to scan physical blocks ($B_0 \sim B_{s-1}$, s is block number that each segment has) in the first segement corresponding logic block address data (LBA; $L_0 \sim L_{r-1}$ "r" is the logical block numbers of one segment. "r" is a little smaller than "s" because of some reserved defect physical blocks.) of the physical blocks ($B_0 \sim B_{s-1}$). Simultaneously, the microprocessor 45 will also store system data more frequently accessed logical data area such as the partition table, the BPB, and the FAT into the FAT accessory lookup table 457 (This table contains physical address values as a general lookup table but is more tiny than general lookup table. Moreover, this table will always be kept after power on.), and partition the flash memory card 31 into at least one segment group according to specification required capacity of the RAM for storing the segment lookup table 455. For example, in this embodiment, $B_0 \sim B_{1023}$ is mapped out as a Seg1 segment, $B_{1024} \sim B_{2047}$ is mapped out as a Seg1 segment, $B_{2048} \sim B_{3071}$ is mapped out as a Seg2 segment, $B_{3072} \sim B_{4095}$ is mapped out as a Seg3 segment, and so on. The size of segment differs according to different memory cards. For instance, for Smart Media cards, a segment comprises 1024 blocks; while for Memory Stick cards, a segment comprises 512 blocks.

When the host computer 49 is to access a file, it will use logical address to build a file system internally (e.g., 49 in FIG. 4A), and send out a logic address to the microprocessor 45 according to the structure of this file system. The host computer 49 acquires the mapped logical address of the file from the FAT of the self-built file system, and transfers this address to the microprocessor 40. The microprocessor converts transferred LBA to logic block address to know in which segment of total blocks in data storage device should be accessed. The microprocessor 45 builds the segment lookup table 455 of this logic block segment into the segment lookup table 455 by scanning physical blocks of decided segment. The FAT accessory lookup table 457 is further used as a matching lookup table when processing a file, as shown in FIG. 4A.

When the host computer 49 is to access another file, the microprocessor 45 judges whether the LBA transferred from host exists in the same segment that lookup table 455 exists. If the answer is negative, the microprocessor 45 will determine again in which segment of the data storage device 31 is this file to be accessed. Meanwhile, the microprocessor still needs to scan logical addresses of all physical blocks of the segment to rebuild a lookup table pertaining to the segment, and then store again into the segment lookup table 455 to be used as a basis for accessing the file.

Because a general file is stored in adjacent physical blocks, the data stored in the segment lookup table will not change so frequently as in the prior art. Therefore, the time wasted in building the lookup table because of change of data is limited. Moreover, the system data more frequently read is fixedly stored in the FAT accessory lookup table 457. Because the logical addresses of this FAT accessory lookup table comprises the whole FAT range the system needs to access (e.g., LBA0~LBA255), when the host computer is to access the FAT of a data system, the sent in logical address can be looked up in this FAT accessory lookup table. This FAT accessory lookup table occupies a relatively small space. For instance, if the FAT accessory lookup table comprises LBA0~LBA255, because each block comprises 32 sectors, only 256/32=8 words are required to contain all logical addresses the FAT will occupy. The data and address the system requires can thus be quickly found out according to necessity of the system. Therefore, not only can the whole processing speed of the system be greatly increased and the operation time be effectively saved, but can the usage ratio of memory of the lookup table also be relatively enhanced.

Figure 5:
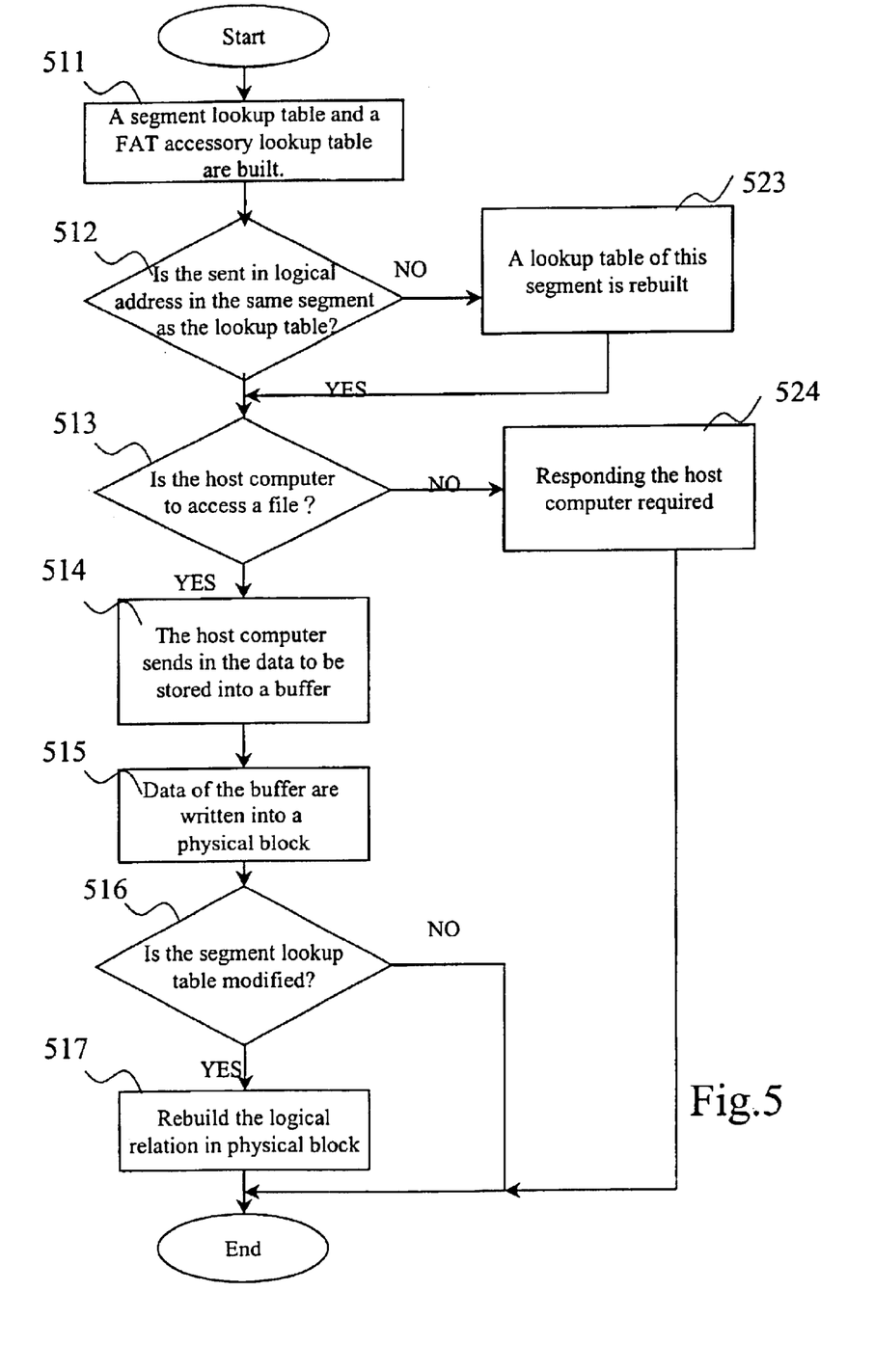
FIG. 5 is an action flowchart of the present invention when a data storage system builds a lookup table and performs instructions.

Furthermore, as shown in FIG. 5, the present invention comprises mainly the following steps.

Step 511: When the control device is turned on, the microprocessor will scan first segment's physical blocks ($B_0$~$B_{s-1}$) to build the first lookup table corresponding logical block addresses ($L_0$~$L_{r-1}$) of data storage device. This segment's lookup table is the first default lookup table stored in RAM. Additionally, some system data's LBA addresses that are more frequently read are stored in a FAT accessory lookup table;

Step 512: Whether the host computer issues an instruction to access a file is judged. The micro-processor will calculate the transferred LBA from host to decide which segment's lookup table should be loaded. If the address is located in different segment of last access, the micro-processor will perform another building process of lookup table for the proper segment (step 523). Otherwise, Step 513 is performed;

Step 523: The microprocessor will quickly find out the corresponding data block and segment of the file, and scan the PBA of this segment to rebuild a segment lookup table. Step 514 is then performed;

Step 513: The micro-processor judges if the command is a write process. Non-write process only involve data out-put from this device or require some response from this device. Non-write process will not influence any data structure of flash. Step 524 is performed; otherwise, Step 514 is performed;

Step 514: The micro-processor let host transfer the desired data to device buffer.

Step 515: Physical block address will be found from the logical block address via the data of the segment lookup table. Data in device buffer will then be stored into a proper page of the physical block.

Step 516: The microprocessor judges whether it is necessary to modify the data in the segment lookup table or the FAT accessory lookup table. If the answer is negative, the instruction issued by the host computer is finished; otherwise, Step 517 is performed;

Step 517: micro-processor should rebuild the logical relation in physical block. This process is matched the defication in SmartMedia specification. Moreover, data of the modified segment lookup table is stored into a physical block of a data storage device. The data already stored in the physical block can be directly stored into the segment lookup table when the host computer or the control device is turned on next time or the file does not belong to the same segment. It is not necessary to use again the control device for searching and building PBA and LBA data of physical blocks, hence greatly reducing operation time of the computer system.

In Step 517, the modified lookup table can itself be used as a set of data, which is wholly stored into a system reservation block of a memory card. When switching to a different segment and then back to the original segment next time, it is not necessary to sweatily scan all physical blocks. What is needed to do is only to read this data into the lookup table.

Figure 6:
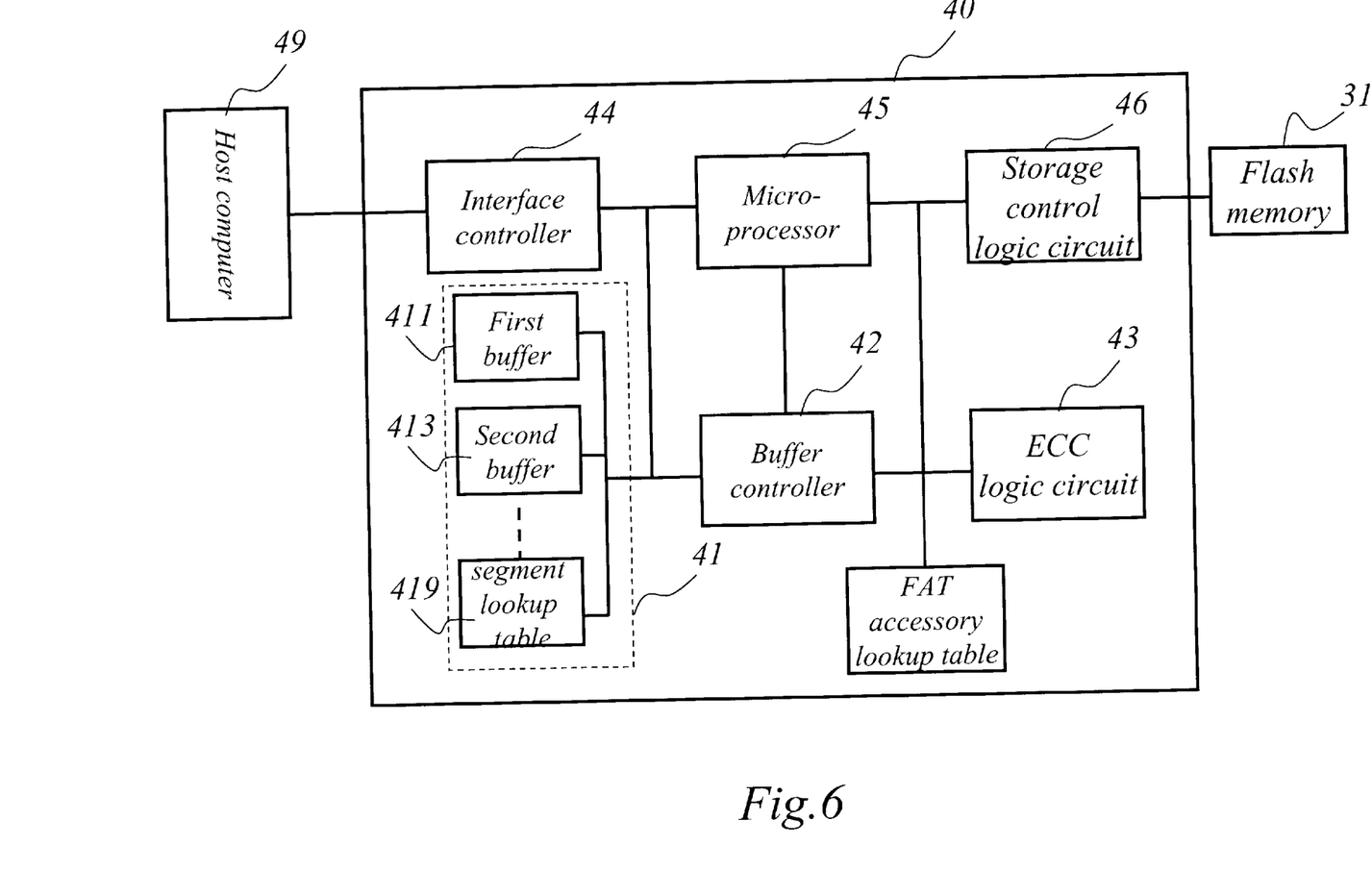
FIG. 6 is a structure diagram of a data storage system according to another embodiment of the present invention.

Finally, please refer to FIG. 6. Because the functions of present computer systems become more and more powerful, and the linked files become more and more complicated, the number of segment lookup table of this embodiment can be more than one. A plurality of replaceable segment lookup tables are provided. Moreover, each segment lookup table 455 can be used as a general data to be stored into a flash memory, hence reducing usage of RAM. Additionally, because the frequency of usage of the FAT accessory lookup table is the highest, it will be built immediately after the system is turned on, and will be always stored in the system until the system is turned off.

To sum up, the present invention relates to a control device applicable to flash memory cards and, more particularly, to a control device compatible to Smart Media cards, Memory Stick cards, and NAND-gate type flash memories and applicable to various kinds of capacities and a method for fabricating same.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A control device for memory cards, said control device being connected between a host computer and at least one data storage device, said control device comprising a microprocessor, at least a segment lookup table, and a FAT accessory lookup table, one end of said microprocessor being connected to said host computer via an interface controller, the other end thereof being connected to each of said data storage device via a storage control logic circuit, said microprocessor being connected to at least a buffer for temporarily storing data via a buffer controller, said microprocessor partitioning said data storage device into a predetermined number of segments, each of said segments comprising at least a physical block, said segment lookup table being capable of storing physical block addresses of physical blocks in at least one of said segment.

2. The control device as claimed in claim 1, wherein said at least one data storage device is one of a Smart Media card, a Memory Stick card, a NAND-gate type flash memory, or a combination thereof.

3. The control device as claimed in claim 1, wherein logical addresses of the physical addresses recorded in said FAT accessory lookup table contain regions for storing the DOS partition table, the BIOS parameter block, and the FAT.

4. The control device as claimed in claim 1, wherein data of said segment lookup table can be stored into said buffer.

5. The control device as claimed in claim 1, wherein data of said segment lookup table can be stored into a, page of physical blocks of said data storage device.

6. The control device as claimed in claim 1, wherein data of said segment lookup table and said FAT accessory lookup table are stored into a random access memory.

7. A fabrication method for memory cards, wherein a control device is utilized to connect a host computer and at least a one data storage device, said method comprising the steps of:

building a lookup table by scanning each physical block of a segment, and load physical block address values to logical block record addresses in said lookup table of said at least one data storage device by said control device when said control device is turned on;

partitioning said at least one data storage device into a predetermined number of segments by said control device, each said segment having at least one physical block;

storing system data more frequently read into a FAT accessory lookup table by said control device; and storing a physical block address of said at least one physical block of a respective segment where a file belongs into a corresponding logical block address of the segment lookup table by said control device when said host computer need to access the segment again.

8. The fabrication method as claimed in claim 7, wherein said system data comprises said FAT accessory lookup table, and logical addresses of said FAT accessory lookup table contain regions for storing a partition table the a BIOS parameter block, and a FAT.

9. The fabrication method as claimed in claim 7, wherein said physical block addresses are stored into a buffer in said control device during the step of building said segment lookup table.

10. The fabrication method as claimed in claim 7, wherein data are stored in a random access memory in said control device during the step of building said segment lookup table.

11. The fabrication method as claimed in claim 7 further comprising the step of:

storing physical block addresses and corresponding logical block addresses of each of said data blocks into some pages of reserved physical block so that segment lookup table can be directly built when said host computer is turned on next time.

12. The fabrication method as claimed in claim 7, wherein said data storage device can apply to a Smart Media card, a Memory Stick card, a NAND-gate type flash memory, or their combination.

* * * * *